T. J. CLARK.
NON-SLIP ATTACHMENT FOR VEHICLE WHEELS.
APPLICATION FILED NOV. 23, 1912.
1,095,451.
Patented May 5, 1914.
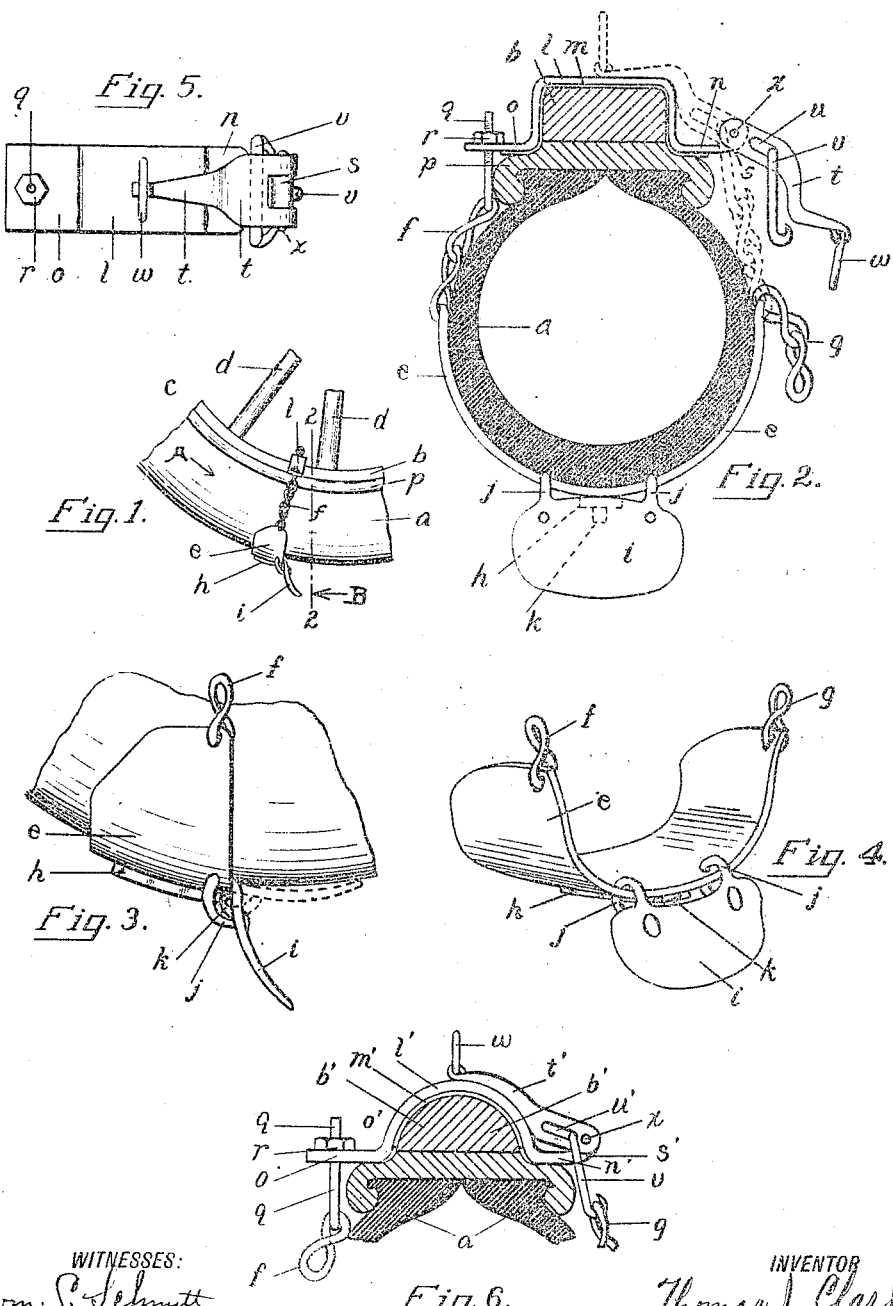

UNITED STATES PATENT OFFICE.

THOMAS J. CLARK, OF MILWAUKEE, OREGON, ASSIGNOR TO T. J. CLARK CO., OF PORTLAND, OREGON, A CORPORATION OF OREGON.

NON-SLIP ATTACHMENT FOR VEHICLE-WHEELS.

1,095,451.  Specification of Letters Patent.  Patented May 5, 1914.

Application filed November 23, 1912. Serial No. 733,229.

*To all whom it may concern:*

Be it known that I, THOMAS J. CLARK, a citizen of the United States, and a resident of Milwaukee, Clackamas county, State of Oregon, have invented a new and useful Improvement in Non-Slip Attachments for Vehicle-Wheels, of which the following is a specification.

My invention relates to attachments for vehicle wheels which will enable the latter to obtain a better grip on the road-bed. Frequently a self-propelled vehicle becomes anchored in the mud and instead of being driven out of same by its own power, the wheels of said vehicle will slip, thereby necessitating the use of auxiliary means for liberating said wheels.

The main object of my invention is to provide devices which may be easily and securely attached to any vehicle wheel, so that when said wheel has a tendency to slip, circumferentially, these devices will dig into the road-bed, thereby preventing such slipping.

A further object of my invention is to provide devices which will not injure the vehicle wheels in any way when the latter are rolling on a hard surface.

The principal features of my device comprise a hinged lip adapted to swing outwardly from the vehicle wheel; a clamping arrangement by which my device may be readily and securely attached to a vehicle wheel; and adjustable means by which my device may be adapted for use on wheels of different sizes. These and other incidental features are fully illustrated in the accompanying drawings forming a part of this specification.

In the drawings: Figure 1 is a fragmentary side elevation of an automobile wheel, showing my device attached to the same; in this view it is to be assumed that the wheel is slipping circumferentially in the direction indicated by the arrow A and the hinged lip having swung outwardly from the wheel is so positioned as to dig into the road-bed; Fig. 2 is a radial section taken approximately on the line 2—2 of Fig. 1, looking in the direction pointed by the arrow B and drawn to a larger scale for the purpose of clearness; the full lines of this figure show my device in its position on the tire, but not fastened thereto, while the broken lines of such figure show the device firmly clamped in position; Fig. 3 is a larger-size detail of certain parts of my device as shown in Fig. 1; the full lines of this view show the position assumed by said parts when the wheel is revolved to drive the vehicle forward, and the dotted lines showing the position assumed by the lip, when said wheel rolls in the opposite direction. Fig. 4 is a perspective view of that portion of my device which bears on the exterior of the wheel, that is, the saddle and the hinged lip; Fig. 5 is a plan view of the clamping device illustrated in Fig. 2, showing the same in a closed or locked position; and Fig. 6 is a fragmentary radial section of an automobile wheel, showing how the details of my clamping device may be arranged to fit different forms of fellies.

The pneumatic tire, $a$, is mounted on a vehicle wheel $c$, the felly of said wheel being indicated by $b$, the clencher rim by $p$, and the spokes by $d$. A saddle, $e$, is adapted to fit snugly over the tire $a$ when the latter is inflated. Attached to the sides of said saddle are the chains, $f$, $g$, and on the exterior face of this saddle is a lug $h$.

A movable lip, $i$, is hinged to the saddle, $e$, by the knuckles $j$. On the lower surface of said lip is a lug or stop $k$, arranged so that when the lip moves in a clockwise direction the lug $k$ will contact with the lug $h$, and prevent a further movement in that direction. See Fig. 3.

A strap, $l$, adapted to fit over the felly, has an inner lining of soft material, $m$, such as felt, so that said felly will not be scratched or injured in any way by the attachment of my device. The strap, $l$, is provided with two longitudinally extending shouldered portions, $n$, $o$, so arranged that they will bear on the clencher rim, $p$, thereby preventing the entire strain from falling on the felly. Said shoulders also provide convenient means for fastening the connections which extend between the strap, $l$, and the saddle $c$. An adjustable bolt, $q$, held in place by a nut $r$, bears in the shoulder $o$ and has fastened to its lower end the chain $f$. The working end of the bolt, $q$, may be lengthened or shortened, thereby adjusting the tension in the chains, $f$, $g$, as desired.

The shoulder, $n$, has on its outer extremity an ear $s$ supporting a pin $x$ on which is pivotally mounted, a lever $t$. This lever is of such a form that when in the act of clamping my device in place the lever is rotated counter-clockwise to the position shown in the broken lines of Fig. 2, it will rest on the strap *l*. The lever *t* is provided with a slot *u*, in which bears a hook *v*, adapted to be connected with the end link of the chain *g*. When said chain and hook are connected, the lever is rotated on its fulcrum pin, *x*, until it is positioned as shown in the dotted lines of Fig. 2. This movement of the hook, *v*, causes a consequent tightening of the chain *g*, thereby clamping the saddle *e* firmly on the tire. By reason of the resultant downward pull being applied to the lever inside the fulcrum of the latter, the tension in the chain *g* serves to hold said lever firmly in its clamped position.

A ring, *w*, fastened to the end of the lever, *t*, affords a convenient means by which said lever may be rotated from its clamped position, as would be required when the device is to be removed from the vehicle wheel.

In Fig. 6 the parts shown act functionally the same as the part shown in Fig. 2, the difference being only in the construction of said parts which are adapted to be used with wheels having fellies of different styles than that shown in Fig. 2.

I claim:

1. A non-slip attachment for vehicle wheels comprising a saddle adapted to fit over the vehicle tire, an inflexible lip hinged to the saddle, the lip arranged to swing outwardly from the tire, and means for clamping said device on a vehicle tire.

2. A non-slip attachment for vehicle wheels comprising a saddle adapted to fit over the vehicle tire, an inflexible lip hinged to the saddle, the lip arranged to swing outwardly from the tire, means which limit the swinging movement of said lip, and means for clamping said device on a vehicle tire.

THOMAS J. CLARK.

Witnesses:
Wm. C. Schmitt,
George A. Hyde.